United States Patent [19]
Zehavi et al.

[11] Patent Number: 5,473,875
[45] Date of Patent: Dec. 12, 1995

[54] TREE-SHAKING APPARATUS WITH DIRECTION AND FREQUENCY OPTIMIZATION CAPABILITY

[76] Inventors: Eitan Zehavi, 12 Alonim Street, Kiriat Tivon 36000; David Chiel, 21 Givat Hamoreh St., Afula Ilit, both of Israel

[21] Appl. No.: 165,026

[22] Filed: Dec. 9, 1993

[51] Int. Cl.$^6$ ............................................. A01D 46/26
[52] U.S. Cl. .................................................. 56/340.1
[58] Field of Search ........................... 56/340.1–328.1, 56/329

[56] References Cited

U.S. PATENT DOCUMENTS

| | | | |
|---|---|---|---|
| 1,626,068 | 4/1927 | Bartlett. | |
| 2,692,470 | 10/1954 | Boman | 56/328 |
| 3,021,168 | 2/1962 | Bodine | 294/88 |
| 3,041,811 | 7/1962 | Sides | 56/328 |
| 3,084,967 | 4/1963 | Harrett | 294/86 |
| 3,121,304 | 2/1964 | Herbst | 56/328 |
| 3,163,458 | 12/1964 | Brandt, Jr. | 294/88 |
| 3,318,629 | 5/1967 | Brandt, Jr. | 294/103 |
| 3,335,556 | 8/1967 | Edgemond, Jr. | 56/328 |
| 3,338,040 | 8/1967 | Shipley, Jr. | 56/328 |
| 3,414,314 | 12/1968 | Martin | 294/103 |
| 3,479,806 | 11/1969 | Pool et al. | 56/328 |
| 3,507,101 | 4/1970 | Bernhausen | 56/1 |
| 3,545,182 | 12/1970 | Bernhausen | 56/1 |
| 3,548,578 | 12/1970 | Shipley, Jr. | 56/328 |
| 3,548,579 | 12/1970 | Shipley, Jr. | 56/329 |
| 3,553,949 | 1/1971 | Rauth | 56/329 |
| 3,596,455 | 8/1971 | Adrian | 56/329 |
| 3,596,972 | 8/1971 | Pool | 294/103 |
| 3,623,308 | 11/1971 | Nye | 56/328 |
| 3,635,004 | 1/1972 | Webb et al. | 56/235 |
| 3,650,099 | 3/1972 | Sitter | 56/328 |
| 3,656,283 | 4/1972 | Shipley | 56/1 |
| 3,771,301 | 11/1973 | Favor | 56/328 |
| 3,771,768 | 11/1973 | Gebendinger | 259/1 |
| 3,780,510 | 12/1973 | Tompkins | 56/328 |
| 3,793,815 | 2/1974 | Hughes | 56/328 |
| 4,128,986 | 12/1978 | Santarelli | 56/328 |
| 4,194,347 | 3/1980 | Peters | 56/328 |
| 4,254,608 | 3/1981 | Friday | 56/328 |
| 4,269,021 | 5/1981 | Friday | 56/329 |
| 4,893,459 | 1/1990 | Orlando | 56/340.1 |
| 4,903,471 | 2/1990 | Bunnelle | 56/340.1 |
| 4,982,558 | 1/1991 | Korthuis | 56/340.1 X |
| 5,123,238 | 6/1992 | Renehan | 56/340.1 X |
| 5,189,871 | 3/1993 | Frederiksen et al. | 56/329 |
| 5,191,758 | 3/1993 | Cote | 56/329 |

*Primary Examiner*—Terry Lee Melius
*Attorney, Agent, or Firm*—Cesari and McKenna

[57] ABSTRACT

A tree-shaking apparatus that includes a pair of vibration units whose eccentric rotators turn at identical speeds but in opposite directions. During operation, rotation of the eccentric members is coordinated by a controller such that their asymmetric portions align at two diametrically opposed points but lie precisely out of phase during the remainder of the rotation cycle. This action causes the tree to shake along a single axis, specified by the chosen alignment of the rotators, with vibratory forces along all other directions canceling out. A controller systematically alters the direction and frequency of shaking and monitors the resulting change in vibration amplitude, selecting, as a final shaking axis and frequency, those which correspond to the largest amplitude.

16 Claims, 2 Drawing Sheets

TREE-SHAKING APPARATUS WITH DIRECTION AND FREQUENCY OPTIMIZATION CAPABILITY

BACKGROUND OF THE INVENTION

1. Field of the Invention

The present invention relates to fruit- and nut-harvesting equipment, and more particularly to apparatus for shaking fruit and nuts from the limbs of trees.

2. Description of the Related Art

Mechanical devices for harvesting fruit and nuts from trees typically operate by gripping the tree trunk and imparting thereto a controlled, low-frequency vibration or shaking action. This operation dislodges the fruit or nuts, which are then collected and transported.

A typical tree-shaking apparatus includes two opposing clamp members that engage the tree trunk, and which are themselves driven by dual oscillation or vibration units. In conventional systems these units operate substantially independently of one another; see, e.g., U.S. Pat. No. 3,338,040. This results in shaking of the tree in a number of different, random directions. Such action is undesirable, because some of these directions may be injurious to the tree; excessive transverse shear, for example, can strip tree bark and abrade the stem. Moreover, two randomly vibrating shakers can at times oppose one another, dissipating energy; or excessively reinforce one another, exerting undue compressive force on the tree.

Some efforts have been made to coordinate the action of the two vibration units, for example, by altering the moments of inertia of the rotators as they spin; see, e.g., U.S. Pat. Nos. 3,548,578 and 4,903,471. Even these improved devices, however, wrench the tree across a range of directions at once, risking damage to the root system. Apparatus for altering a rotator's moment of inertia can, in addition, be rather complex, as exemplified by the '471 patent.

Practitioners have also experimented with variation of the frequency of shaking. Every physical system possesses a unique, natural resonance frequency. Vibrating the system at its resonance frequency results in the maximum amplitude of displacement and, in the resent context, the most efficient removal of fruit or nuts. Thus, U.S. Pat. No. 3,650,099 discloses a limb shaker having a variable throttle that the user can adjust until the greatest displacement is observed. Such a fully manual approach is both cumbersome and imprecise, and is therefore poorly suited to commercial harvesting.

DESCRIPTION OF THE INVENTION

OBJECTS OF THE INVENTION

Accordingly, it is an object of the present invention to provide a tree-shaking apparatus that can maximize the efficiency of harvesting by automatically determining the natural resonance frequency of a tree.

It is another object of the invention to automatically match the frequency of tree shaking to the tree's resonance frequency.

It is a further object of the invention to provide a tree-shaking apparatus that is capable of varying the direction of tree shaking.

It is yet a further object of the invention to shake a fruit- or nut-bearing tree along a single axis.

It is another object of the invention to vary both the direction and frequency of tree shaking to maximize the efficiency of harvesting.

Yet another object of the invention is to provide an apparatus for tree shaking that avoids damage to the tree.

Other objects will, in part, be obvious and will, in part, appear hereinafter.

The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

BRIEF SUMMARY OF THE INVENTION

In accordance with the invention, a tree-shaking apparatus includes a pair of vibration units whose eccentric rotators turn at identical speeds but in opposite directions. The units laterally clamp a tree and are maintained in a fixed orientation by hydraulic pressure so they move as a single unit.

During operation, rotation of the eccentric members is coordinated by a controller such that their asymmetric portions align at two diametrically opposed points but lie precisely out of phase during the remainder of the rotation cycle. This action causes the tree to shake along a single axis, specified by the chosen alignment of the rotators, with vibratory forces along all other directions canceling out. The vibration units are mounted on a frame that accommodates motion in two dimensions, permitting efficient transfer of force to the tree while avoiding damage to the apparatus support structure.

A controller systematically alters the direction of shaking and monitors the resulting change in vibration amplitude, selecting, as a final shaking axis, the direction corresponding to the largest amplitude. Preferably, the invention also permits an operator to specify an allowed range of directional change, since axes that deviate significantly from lateral, side-to-side motion present the risk of tree abrasion.

The controller also scans through a predetermined range of shaking frequencies in order to locate the tree's resonance frequency. The controller monitors the vibration amplitude across the range of frequencies and selects, as a final shaking frequency, the one corresponding to the largest amplitude.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
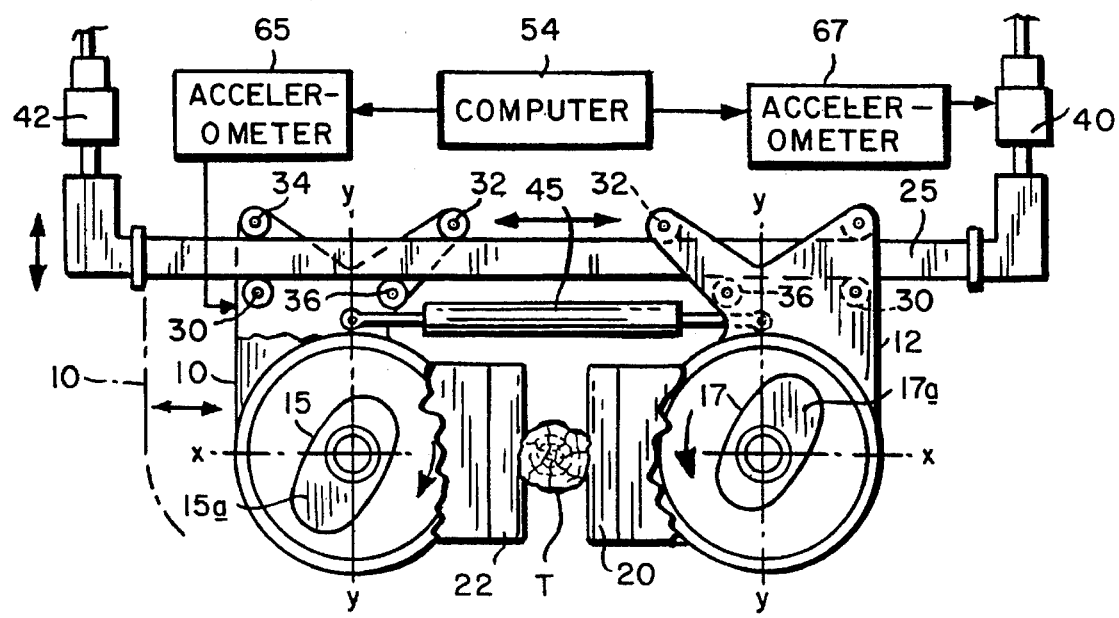
FIG. 1 is a plan view of a tree-shaking apparatus embodying the present invention, with accelerometers appearing in block form.

Refer first to FIG. 1, which illustrates the basic elements of the invention. The depicted shaking apparatus includes twin vibration units 10, 12 disposed on opposite sides of a tree T. Rotatably mounted within each vibration unit is an eccentric mass or weight 15, 17, which contains an asymmetric portion 15a, 17a. Weights 15 and 17 can be fixed oblate members mounted off-center, as shown in FIG. 1, or adjustable-length hammers, as shown, for example, in U.S. Pat. No. 3,656,283 (the entire disclosure of which is hereby incorporated by reference). Rotation of weights 15 and 17 is described further below.

Secured to the inner sides of each vibration unit is an engagement pad 20, 22 for gripping a tree without damage due to vibration. Suitable forms of engagement pad are well-known in the art and can include, for example, the pads described in copending application Ser. No. 08/163,030, filed Dec. 9, 1993 and entitled COMPLAINT ENGAGEMENT MEMBER FOR USE WITH TREE-SHAKING APPARATUS, commonly owned with the present application and hereby incorporated by reference; and U.S. Pat. Nos. 4,921,073, 3,479,806 and 3,656,283, all of which are hereby incorporated by reference.

The vibration units are mounted on a frame in a manner that permits unimpeded motion along any vibration axis. The support frame therefore includes a rail 25 along which the units are free to travel, accommodating side-to-side shaking in the direction of the horizontal arrow. The vibration units are engaged to rail 25 by means of a guide assembly, shown within unit 10. The guide assembly includes two pairs of bearings 30, 36 and 32, 34 that travel against rail 25 on opposite sides. Although these can be standard metal roller bearings, such that the vibration units rollingly engage rail 25, we have obtained superior results with TEFLON plugs that slide along rail 25. The latter arrangement appears to tolerate better the stresses of vibration.

Figure 3:
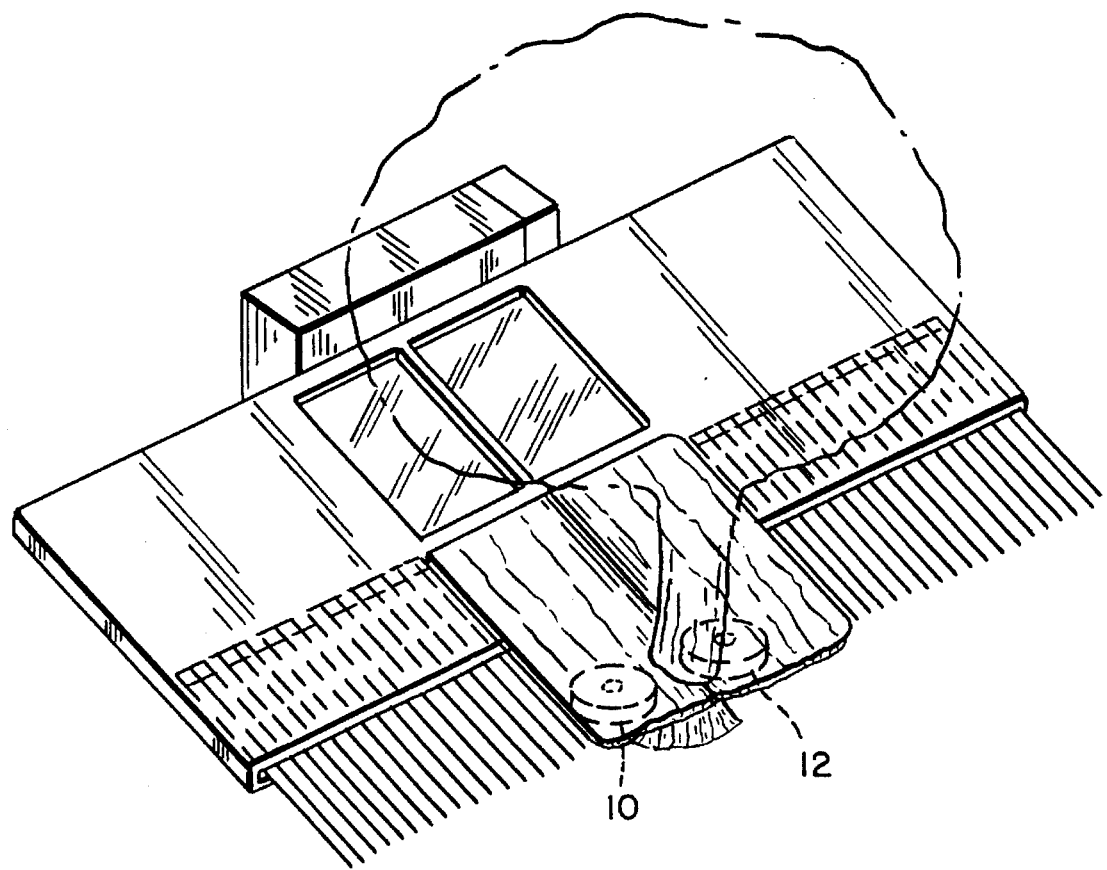
FIG. 3 is an isometric view showing the invention situated within a representative harvesting apparatus.

To accommodate motion along the direction indicated by the vertical arrow, rail 30 is mounted to a pair of shock absorbers 40 and 42, which are themselves secured to the structure that transports the vibration units from tree to tree. The characteristics of that structure are not critical to the present invention, and can range from a simple, manually hauled frame with wheels to the more elaborate motorized design shown in FIG. 3.

To engage a tree between vibration units 10 and 12, the operator spreads the units along rail 25 by, for example, displacing a single unit as shown in phantom in FIG. 1) and situating the apparatus so that the pad of the opposite unit rests against the tree. vibration units 10 and 12 are connected by a double-action hydraulic cylinder 45, which may be controlled by the operator to draw the vibration units toward one another until the tree is engaged with a desired force, and subsequently to maintain that position by hydraulic pressure. The former action ensures that the tree will be gripped without skew or torque, while the latter forces the vibration units to move a=a single structure.

Figure 2:
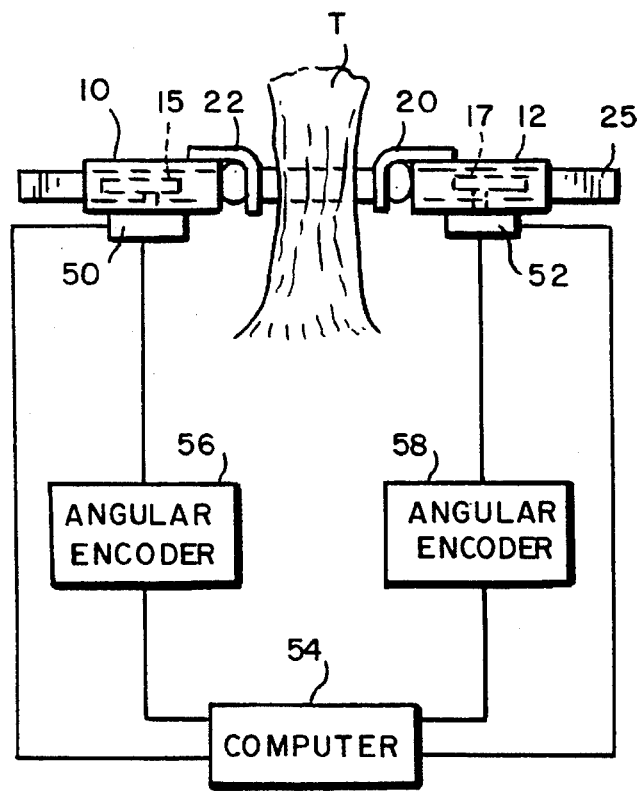
FIG. 2 is an elevational view of the apparatus shown in FIG. 1, with control elements appearing in block form.

Refer now to FIG. 2, which illustrates further features of the invention associated with its operation. A pair of motors 50, 52 rotates weights 15, 17, respectively, imparting vibration to the tree T as a result of the weights' asymmetric construction. Motors 50 and 52 are coupled to a computer or other suitable control device 54. The motors may be electrical or fuel-powered, so long as their operation may be closely controlled as described hereinafter.

A pair of angular encoders 56, 58, associated with each of the motors 50, 52 or their external shafts, monitors rotation of the weights and furnishes data representing angular position to computer 54. Computer 54, in turn, processes the information and correlates it with an instantaneous orientation of asymmetric weight portions 15a, 17aA, so that computer 54 is constantly "aware" of the individual weight orientations and their angular velocities. Computer 54 is also capable of individually controlling the rotation speeds of motors 50 and 52.

The nature of the vibration imparted to a tree depends entirely on the respective orientations and angular velocities of weights 15 and 17. As shown in FIG. 1, in the present invention the weights rotate in opposite directions but at the same angular velocity. Computer 54 keeps weights 15 and 17 in phase with one another, so that at two opposite points during the rotations their eccentric portions are aligned with one another and oriented in the same direction; at all other points, however, the eccentric portions are out of phase (i.e., on opposing sides of the shaking axis), and therefore mutually cancel out the off-axis forces each would otherwise impart to the tree. The shaking axles corresponds to the direction in which the eccentric weight portions point when they are aligned.

Accordingly, to rock the tree from side to side, computer 54 coordinates the rotations of weights 15 and 17 such that eccentric portions 15a and 17a align with one another along the horizontal axis x shown in FIG. 1. To shake the tree perpendicularly, eccentric portions 15a and 17a align with one another along the vertical axis y shown in FIG. 1. Shaking along any intermediate axis is straightforwardly obtained through alignment, by computer 54, of the weights along that axis. The vibratory force thus imparted is prevented from being transformed to elements of the support structure by rolling movement along the rail and shock absorbers 40, 42.

Naturally, it is side-to-side motion (along the x axis) that poses the least danger of tree damage, since the chance of pads 20 and 22 slipping against the tree bark is minimized. The probability of slippage increases as the direction of shaking deviates from the x axis. However, the root structure of a tree is usually uneven, rendering the tree more compliant in some directions than in others. The capability of oblique shaking is therefore quite useful. The safe range of shaking angles is determined by the resilience of the tree, the coefficients of friction of the pads, and the tightness with which the pads can be positioned against the tree.

The present invention is equipped to determine the optimum shaking angle, within a range of safe angles provided by the operator, by incrementally sweeping through that range and assessing the amplitude of tree vibration at each increment. That amplitude is measured by a pair of accelerometers or displacement gauges 65 and 67, which detect movement of the vibration units along the x and y axes, respectively. (Pads 20 and 22 will ordinarily absorb some vibratory motion, so that the displacement of the vibration units does not precisely correspond to displacement of the tree; this is unimportant, however, for comparative purposes.)

Computer 54 tracks the sum of the x-axis and y-axis displacement amplitudes at each directional increment. When it has swept the direction of vibration through the allowed range, it selects, as a final shaking axis, the direction corresponding to the greatest summed amplitude. Fruit or nuts are most efficiently dislodged at this amplitude.

Computer 54 preferably changes the direction of shaking by momentarily decelarating or accelerating one of the motors 50, 52, and then reversing the deceleration or acceleration so that the motor's rotation speed once again matches that of the other motor. The duration and extent of acceleration or deceleration determines the final orientation of the associated weight (relative to the other weight) when it reaches its operating angular velocity. This is precisely calculated and implemented by computer 54 to produce alignment of eccentric portions 15a and 17a along the desired axis. Preferably, computer 54 is adapted to allow the operator to provide both the angular range of allowed directional variation and the degree of change between increments.

The other determinant of shaking amplitude is the vibration frequency. As noted previously, every tree exhibits a characteristic resonance frequency; shaking the tree at this frequency results in the maximum displacement amplitude and, consequently, the most efficient harvesting. The present invention is configured to determine and exploit a tree's resonance point by scanning continuously through a range of frequencies, selecting the frequency of maximum displacement (measured by accelerometers 56 and 58) as a final shaking frequency.

The frequency of shaking is specified by the (matched) angular velocity of motors 50 and 52. This velocity is set and altered by computer 54. Alteration occurs in a synchronous manner, so that both motors experience identical changes in speed during scanning. The range of frequencies through which the vibration units are optimally drawn is determined by the characteristics of the tree being shaken. We have found, however, that trees of a given type tend to exhibit natural resonance frequencies that vary only within a narrow band. For example, the resonance frequencies of citrus trees tend to lie between 8 and 9 Hz; accordingly, a sweep between 2–3 and 12–15 Hz is typically sufficient to locate the resonance frequency of a given citrus tree.

In the preferred embodiment of the invention, computer 54 first determines the best shaking axis within the allowed range, and then determine the tree's resonance frequency. The tree is ultimately shaken along the selected axis and at the located resonance frequency for a preset time or until the operator orders termination. During shaking, computer 54 monitors and controls the speed of motors 50 and 52 so that they rotate at the same rate. Computer 54 can also be configured to periodically monitor the relative positions of eccentric portions 15a and 17a, and to re-establish proper alignment if deviation from the shaking axis is detected.

It will therefore be seen that the foregoing represents a highly advantageous and efficient approach for harvesting fruit and nuts from trees. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A tree-shaking apparatus comprising:
   a. two vibration units, each unit comprising:
      1) an eccentric rotation member;
      2) means for rotating the eccentric member;
      3) means for sensing an instantaneous angular position of the eccentric member; and
      4) means for engaging a tree;
   b. means for positioning the vibrating units on opposite sides of a tree;
   c. control means, coupled to the rotation and position-sensing means, including:
      1) means for controlling the rotations of both eccentric members to conform to a uniform speed in opposite directions, thereby providing a predetermined shaking frequency; and
      2) means for coordinating, in response to data provided by the position-sensing means, the rotations of both eccentric members such that they rotate in phase, thereby shaking the tree along a single axis.

2. The apparatus of claim 1 further comprising means for measuring displacement along the shaking axis, and wherein the control means further comprises:
   a. means for varying the shaking frequency by synchronously altering the rotation speeds of the eccentric members; and
   b. means for selecting and maintaining the frequency corresponding to maximum displacement.

3. The apparatus of claim 2 wherein the frequency varies between 2 and 15 Hz.

4. The apparatus of claim 2 wherein the selecting means includes gauges that measure total displacement along two dimensions.

5. The apparatus of claim 1 wherein the control means is adapted for varying the direction of tree shaking, the control means further comprising:
   a. means for associating the relative angular positions of both eccentric members with a corresponding shaking direction;
   b. means for varying the relative angular positions of both eccentric members to achieve a predetermined shaking direction.

6. The apparatus of claim 5 wherein the position-varying means comprises means for momentarily decelarating at least one eccentric member and reaccelerating the at least one eccentric member to the uniform speed.

7. The apparatus of claim 5 wherein the position-varying means comprises means for momentarily accelarating at least one eccentric member and decelerating the at least one eccentric member to the uniform speed.

8. The apparatus of claim 5 further comprising means for measuring displacement along the shaking axis, and wherein the control means further comprises means for selecting and maintaining the direction corresponding to maximum displacement.

9. The apparatus of claim 8 wherein the selecting means includes gauges that measure total displacement along two directions.

10. The apparatus of claim 8 wherein the control means further comprises:
    a. means for varying the shaking frequency by synchronously altering the rotation speeds of the eccentric members and
    b. means for selecting and maintaining the frequency corresponding to maximum displacement along a predetermined direction of tree shaking.

11. The apparatus of claim 10 wherein the selecting means includes gauges that measure total displacement along two directions.

12. The apparatus of claim 5 further comprising means for limiting the variation in tree-shaking direction to avoid damage to the tree.

13. The apparatus of claim 1 wherein the positioning means includes means for accommodating, without significant resistance, motion in two directions.

14. The apparatus of claim 1 wherein the positioning means includes means for maintaining a fixed orientation between the vibrating units, such that they move as a single fixture.

15. The apparatus of claim 1 wherein the eccentric members are oblate weights mounted off-center.

16. The apparatus of claim 1 wherein the eccentric members are hammers.

* * * * *